(12) United States Patent  (10) Patent No.: US 11,074,224 B2
Qiu et al.  (45) Date of Patent: Jul. 27, 2021

(54) PARTITIONED DATA REPLICATION

(71) Applicant: Apple Inc., Cupertino, CA (US)

(72) Inventors: James Qiu, Santa Clara, CA (US); Hui Wang, San Mateo, CA (US); Frank Lu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 14/709,379

(22) Filed: May 11, 2015

(65) Prior Publication Data

US 2016/0335288 A1 Nov. 17, 2016

(51) Int. Cl.
G06F 16/178 (2019.01)

(52) U.S. Cl.
CPC ................ G06F 16/178 (2019.01)

(58) Field of Classification Search
CPC ................................ G06F 17/30174
USPC ........................................ 707/617
See application file for complete search history.

(56) References Cited

U.S. PATENT DOCUMENTS

| 7,039,661 | B1 * | 5/2006 | Ranade | G06F 17/30575 |
| | | | | 707/610 |
| 7,200,620 | B2 | 4/2007 | Gupta | |
| 7,606,841 | B1 * | 10/2009 | Ranade | G06F 16/184 |
| | | | | 707/615 |
| 8,065,268 | B1 * | 11/2011 | Ghemawat | G06F 16/178 |
| | | | | 707/610 |
| 9,569,517 | B1 * | 2/2017 | Smola | G06F 17/30575 |
| 2002/0120637 | A1 * | 8/2002 | Parham | G06F 16/278 |
| | | | | 707/999.201 |
| 2005/0071389 | A1 * | 3/2005 | Gupta | G06F 16/27 |
| | | | | 707/999.204 |
| 2010/0058013 | A1 * | 3/2010 | Gelson | G06F 21/6272 |
| | | | | 711/162 |
| 2011/0087633 | A1 | 4/2011 | Kreuder et al. | |
| 2011/0099342 | A1 * | 4/2011 | Ozdemir | G06F 11/2066 |
| | | | | 711/162 |
| 2011/0167038 | A1 * | 7/2011 | Wang | G06F 16/27 |
| | | | | 707/627 |
| 2011/0238621 | A1 * | 9/2011 | Agrawal | G06F 16/273 |
| | | | | 707/610 |
| 2011/0313973 | A1 * | 12/2011 | Srivas | H04L 65/102 |
| | | | | 707/634 |
| 2012/0233228 | A1 * | 9/2012 | Barton | G06F 16/178 |
| | | | | 707/827 |

(Continued)

FOREIGN PATENT DOCUMENTS

EP 0 724 223 7/2001

Primary Examiner — Pierre M Vital
Assistant Examiner — Andrew N Ho
(74) Attorney, Agent, or Firm — Fish & Richardson P.C.

(57) ABSTRACT

System, method, and computer program product for partitioned data replication are described. A data replication system can partition a file stored on a primary storage device into multiple data blocks, and store an index mapping the blocks and the file. Initially, the system can replicate the file and the index to a secondary storage device. The data stored in the file can change after the initial replication. The system can determine which block among the data blocks has changed by updating the index and comparing the updated index with the original index. The system can then replicate the change by replicating only the changed block and the updated index to the secondary system.

31 Claims, 10 Drawing Sheets

(56) References Cited

U.S. PATENT DOCUMENTS

| | | | | |
|---|---|---|---|---|
| 2013/0103729 A1* | 4/2013 | Cooney | ............... | G06F 16/188 707/831 |
| 2013/0275656 A1* | 10/2013 | Talagala | ............. | G06F 12/0246 711/103 |
| 2014/0337375 A1* | 11/2014 | Yue | .................... | G06F 16/2246 707/769 |

* cited by examiner

PARTITIONED DATA REPLICATION

TECHNICAL FIELD

This disclosure relates generally to replicating data files.

BACKGROUND

Data replication operations can be essential in database and cloud computing technologies. For example, in database backup or data distribution, a computer system can replicate large amounts of data. Conventional data replication technologies can include block level replication and file level replication. In block level replication, a data replication system can replicate data stored on a first storage device to a second storage device according to the first storage device's internal block level organization (e.g., disk partitions, sectors, and blocks). In file level replication, a data replication system can copy data from a first storage device to a second storage device on a file-by-file basis. If data in a file changes after the file is replicated, the system can mark the file as "dirty" and then replicate the file again, to replicate the change.

SUMMARY

Techniques for partitioned data replication are described. A data replication system can partition a file stored on a primary storage device into multiple data blocks, and store an index mapping the blocks and the file. Initially, the system can replicate the file and the index to a secondary storage device. The data stored in the file can change after the initial replication. The system can determine which block among the data blocks has changed by updating the index and compare the updated index with the original index. The system can then replicate the change by replicating only the changed block and the updated index to the secondary system.

The features described in this specification can achieve one or more advantages. Compared to conventional block level replication technologies, the partitioned data replication technologies do not require knowledge of structure of a storage device, and can allow more flexible replication. Compared to conventional file level replication technologies, the partitioned data replication has finer granularity. In particular, for example, when a large database or media file has made a small change, rather than marking the entire file as dirty and replicating the entire file, the techniques described in this specification can limit the amount of data replicated by replicating only a portion of a file that includes the small change.

The technologies described in this specification can be advantageously applied in database systems, hot stand-by systems, and cloud computing. When a primary system and a secondary system are not collocated, the technology makes real-time or near real-time replication possible over a network that may be unreliable or slow, even when multiple large files change frequently.

The details of one or more implementations of the subject matter are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Exemplary File Replication

Figure 1:
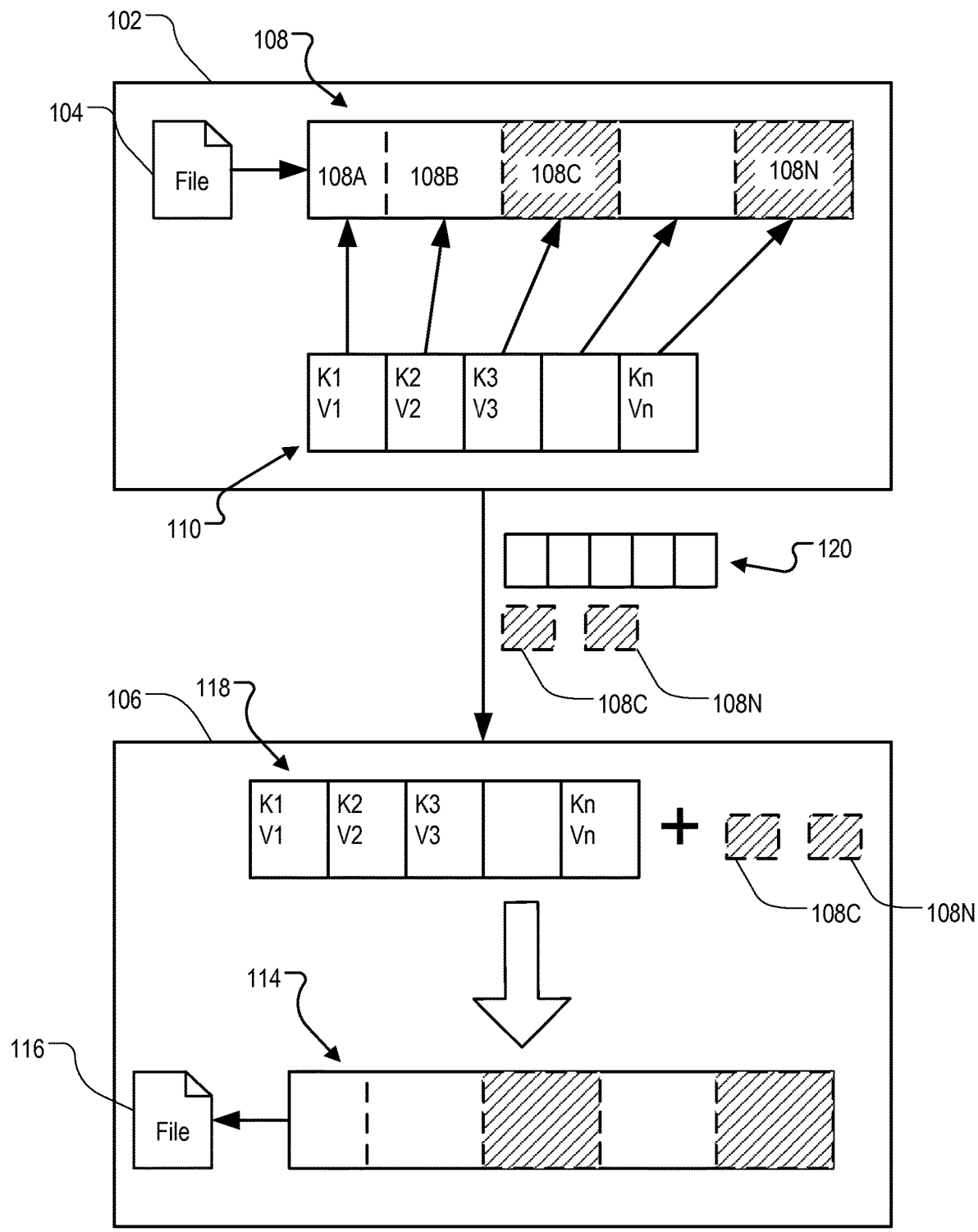
FIG. 1 is a diagram illustrating an example of partitioned replication of a data file.

FIG. 1 is a diagram illustrating an example of partitioned replication of a data file. A system, for example, a shared-nothing distributed database system, can include multiple servers among which data is replicated. Primary server 102 can store data file 104 that is to be replicated to secondary server 106. Each of primary server 102 and secondary server 106 can include one or more computer processors and one or more storage devices. Data file 104 can be a database file storing user data, a multimedia file storing remote container data that is outside of a database file and referenced in a database file, or a log file (e.g., redo log file) storing database transaction logs.

Primary server 102 can partition data file 104 into multiple blocks 108, including, for example, blocks 108A, 108B . . . , 108N. Blocks 108 can be logical blocks of data file 104. Each of blocks 108 can have a size of m kilobytes (KB), for example, 32 KB or 64 KB. In some implementations, a first block 108A located at the beginning of data file 104 can correspond to a header section of data file 104 and have a size that is different from the size of other blocks. Primary server 102 can pad the last block, block 108N, to size m KB, if the last block is smaller than m KB. Primary server 102 may or may not store blocks 108 on a storage device physically separate from data file 104.

Primary server 102 can create segment list 110 for blocks 108 of data file 104. Segment list 110 can include multiple key-value pairs, K1-V1, K2-V2, . . . Kn-Vn. Each key-value pair can correspond to a respective block of data file 104. The key in each key-value pair can be a unique identifier of a corresponding block. The unique identifier can include a file identifier identifying data file 104 and a reference to a location of the corresponding block in data file 104. The value in each key-value pair can be a checksum value that represents content in the block. The checksum value can be a hash value. If content of a block changes, the value for that block changes. In some implementations, the key in each key-value pair can be the checksum value, and the value can be the unique identifier including the file identifier and the reference to the locations. In these implementations, if a same block having a same checksum appears in multiple locations or multiple files, the value of the key-value pair can be a list of unique identifiers each representing a different appearance. Primary server 102 can store segment list 110 as an index of data file 104. The index can be sorted by the keys or values of the key-value pairs.

In an initial stage of data replication, primary server 102 can replicate data file 104, including each block 108 of data file 104, to secondary server 106. In addition, primary server 102 can replicate an index on data file 104 to secondary server 106. The index can include segment list 110. Secondary server 106 can store the received blocks as replicated blocks 114 that are parts of data file 116. Secondary server 106 can store the received segment list as replicated segment list 118.

On primary server 102, a process may update data file 104. After the update, a conventional system may mark data file 104 as dirty, and copy the updated data file 104 to secondary server 106. In a system implementing partitioned data replication, primary server 102 can identify the blocks of data file 104 that changed in the update, and replicate only those changed blocks.

For example, a database process may modify block 108C and 108N of data file 104 by executing an "UPDATE" command. Updated block 108C and 108N are illustrated as shaded blocks. Primary server 102 can identify blocks 108C and 108N, or cause blocks 108C and 108C to be identifiable by secondary server 106. Primary server 102 can generate an updated segment list including key-value pairs of updated data file 104.

In some implementations, primary server 102 can compare the updated segment list and segment list 110 as previously generated. Primary server 102 can determine that the values corresponding to blocks 108C and 108N in the updated segment list are different from the keys corresponding to blocks 108C and 108N in segment list 110. In response, primary server 102 can determine that data file 104 is "dirty" and needs to be replicated to secondary server 106. Instead of sending data file 104 to secondary server 106 in the entirety, primary server 102 can send updated segment list 120 and the updated blocks 108C and 108N to secondary server 106 for replication.

In some other implementations, primary server 102 can submit updated segment list 120 to secondary server 106 first. Upon receiving updated segment list 120, secondary server 106 can determine which block of data file 116 has changed by comparing updated segment list 120 with segment list 118 previously stored on secondary server 106. Secondary server 106 can determine that values V3 and Vn in the key-value pairs corresponding to blocks 108C and 108N have changed. Secondary server 106 can determine if secondary server 106 already stores updated blocks 108C and 108N locally. Secondary server 106 can request updated blocks 108C and 108N only if secondary server 106 does not have those blocks already stored locally. Primary server 102 can submit updated blocks 108C and 108N to secondary server 106 upon receiving the request. In some implementations, primary server 102 can submit updated segment list 120 together with updated blocks 108C and 108N.

Secondary server 106 can then stitch updated blocks 108C and 108N into respective locations of data file 116, for example, by dissembling data file 116 into blocks, replacing the blocks at locations as indicated in the keys of the key-value pairs corresponding to updated blocks 108C and 108N, and re-assembling the blocks into one piece. After re-assembling, secondary server 106 can designate data file 116 as a replica of updated data file 104.

Figure 2:
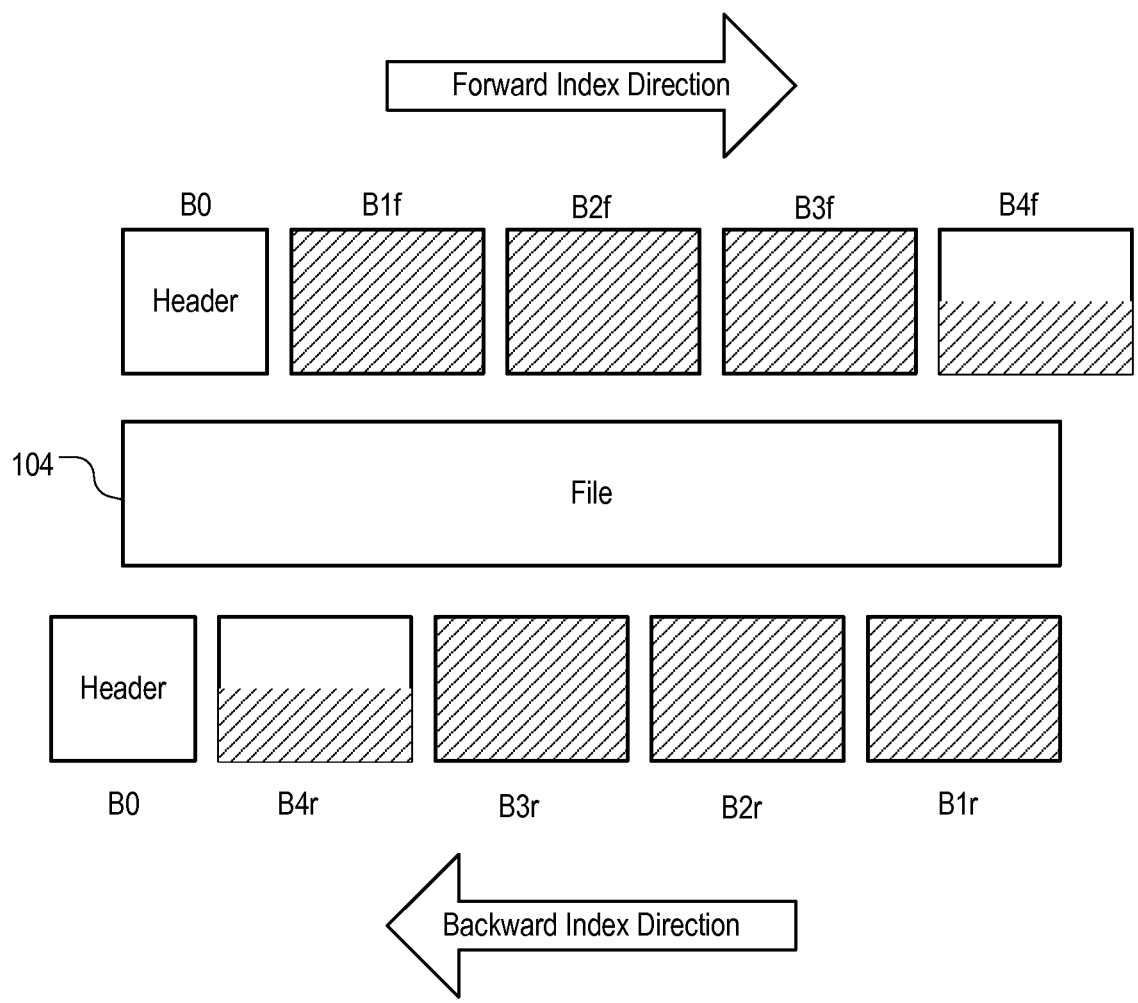
FIG. 2 is a diagram illustrating an example of bi-directional partitioning of a data file.

FIG. 2 is a diagram illustrating an example of bi-directional partitioning of a data file. A process can modify data file 104 in various ways. For example, data file 104 can correspond to a database table. An "UPDATE" command that changes a particular data record stored in the table can modify data file 104. An "INSERT" command that adds a data record to the table at a particular location can modify data file 104. A "DELETE" command that deletes a data record from the table can modify data file 104. Accordingly, a change in data file 104 may occur near the beginning, near the end, or at a random location of data file 104. If an insertion occurs near the beginning of data file 104, and partition of data file 104 is from the beginning to end, all blocks following the insertion may change. All hash values for the changed blocks will change, accordingly.

A primary server (e.g., primary server 102 of FIG. 1) can partition data file 104 in a bi-directional manner to minimize number of blocks to send to a secondary server. In the example shown, in a forward partition, the primary server can partition data file 104 into blocks B1$f$, B2$f$, B3$f$, and B4$f$, starting from the beginning of data file 104 or from near the beginning of data file 104. In the example shown, the forward partitioning results in four 32 KB blocks, the last one, B4$f$, includes padding. The primary server can then generate a respective value, e.g., hash value, for each of the blocks B1$f$, B2$f$, B3$f$, and B4$f$.

Data file 104 (e.g., a movie file) can include a header and content. The header portion of data file 104 can store metadata of the content. In some implementations, the primary server designates the header as header block B0. The size of header block B0 may or may not be the same as sizes of other blocks. The primary server can generate a key for the header block B0. Each respective key for blocks B0 and B1$f$ through B4$f$ can point to a location of the respective block in data file 104. For example, the keys can be 0, size of header block, size of header block+ size of block, size of header block+2*(size of block), etc.

In a backward partition, the primary server can partition data file 104 into blocks B1$r$, B2$r$, B3$r$, and B4$r$, starting from the end of data file 104, and ending at the beginning of data file 104 or at a block B4$f$ that is adjacent to a header of data file 104. Optionally, the primary server can designate header block B0 the header. The primary server can generate a respective hash value for each block, and associate a respective value for each key. In the example shown, the keys corresponding to blocks B0, B4$r$, B3$r$, B2$r$, and B1$r$ can be 0, size of header block, size of header block+ size of content in block B4$r$, size of header block+ size of content in block B4$r$+ size of block, size of header block+ size of content in block B4'+2*(size of block), respectively. If a process changes content in data file 104, for example, by inserting data in a block adjacent to the header of data file 104, in the forward partitioning, blocks B1$f$ through B4$f$ may all change; in the backward partitioning, only block B4$r$ changes, and blocks B1$r$ through B3$r$ may remain unchanged. The segment lists produced from both the forward partitioning and the backward partitioning can be ordered in various manners, for example, by the keys in the key-value pairs, or by the values.

Figure 3:
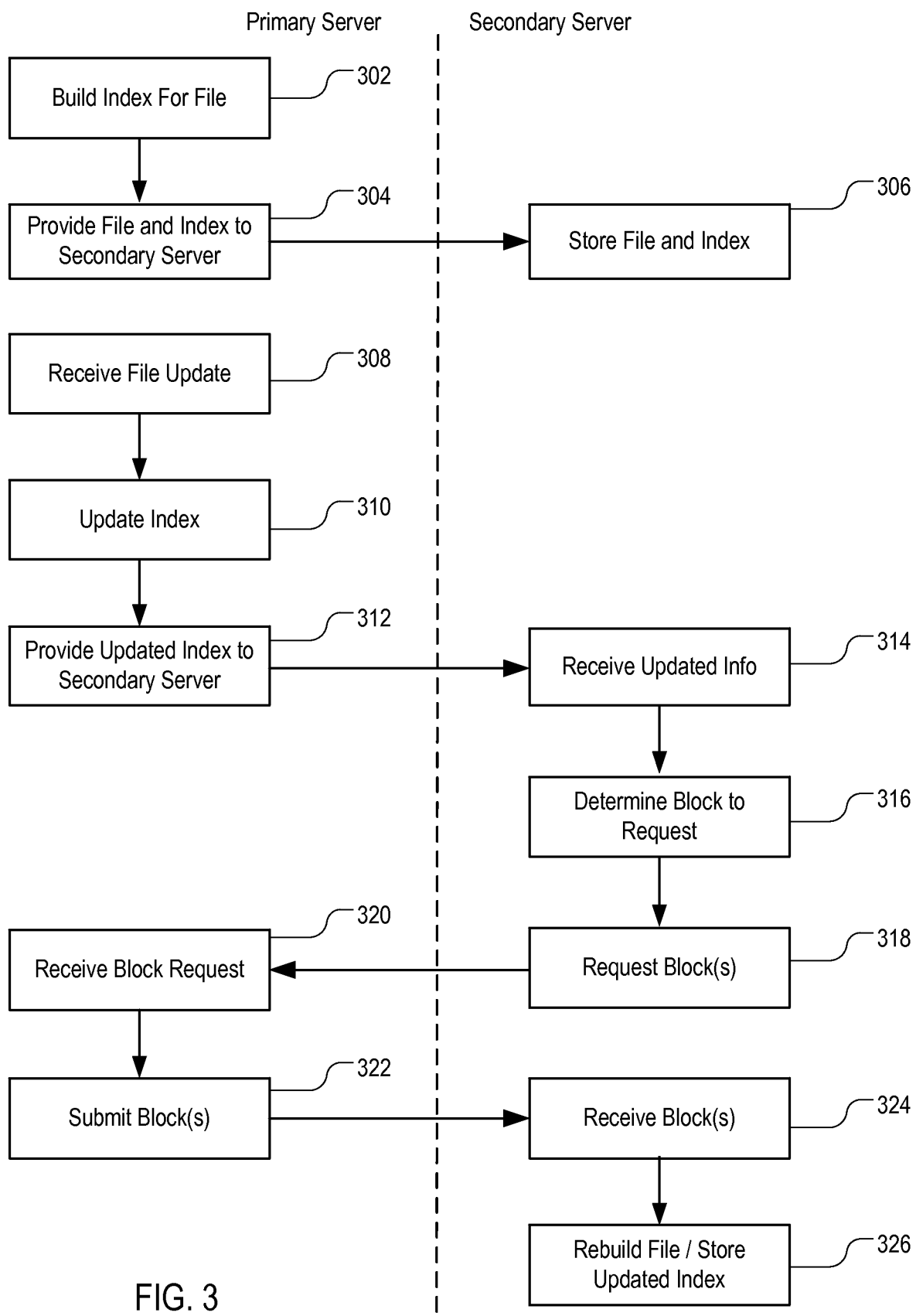
FIG. 3 is a flowchart illustrating example interaction between a primary server and a secondary server in partitioned data replication.

FIG. 3 is a flowchart illustrating example interaction between a primary server and a secondary server in partitioned data replication. The primary server (e.g., primary server 102 of FIG. 1) can be a server from which a data file (e.g., data file 104 of FIG. 1) is replicated. The primary server can be a hot standby server that uses a share-nothing model, and that replicates live data to a standby secondary server (e.g., secondary server 106 of FIG. 1). Each of the primary server and the secondary server can keep a full set of files redundantly to avoid a single point of failure.

At the beginning, the primary server can replicate all files to the secondary server. The files to replicate over can include database files and remote container files. At this stage, the primary server may or may not have a log file. When a database hosted on the primary server is alive, the primary server can replicate log files and updated remote container files to the secondary server. If log files are lost from the secondary server, the primary database server can resynchronize with the secondary database server by sending all database files and remote container files. Log files, in particular redo log file, can be generated when a database encounters a checkpoint, or upon commitment of an explicit database command (e.g., a "Pause Database for Update" command). A database administrator can commit the database command. As soon as a redo log file is generated, the primary server can send the redo log file to the secondary server. In the example shown, the data file can be any of a container file, a redo log file, or a user data file.

The primary server can build (302) an index of the data file. Building the index can include generating a forward segment list using forward partitioning, generating a reverse segment list using backward partitioning, or both. The data file may have a size of n bytes. The primary server can determine a series of blocks, each having m KB, from the beginning to the end, from the end to the beginning, or both. The primary server can pad the last block in the series to m KB. For example, for a redo log file having a size of 8 MB, the primary server can determine that the redo log file contains 256 blocks, including fs001, fs002 . . . , fs256. The primary server can produce a series of blocks on reverse of the same file, e.g., rs001, rs002 . . . , rs256. The primary server can then build the key-value pairs for the blocks.

The primary server can then provide (304) the data file and the index, which can include both the forward segment list and the reverse segment list, to the secondary server. Originally, the data file can have a forward series of blocks fs001, fs002 . . . , fs010, and a reverse series of blocks rs001, rs002 . . . , rs010. The secondary server can store (306) the received data file and index locally.

The primary server can receive (308) a file update. In a first example, a process executing on the primary server can append a new block to the end of the data file. The primary server can update (310) the index. Updating the index can include generating a new key-value pair fs011 to the forward segment list, and regenerating the reverse segment list, starting from the newly added block.

In a second example, a process executing on the primary server can update data near the beginning of the data file, for example, by adding one or more characters in the block fs001, which corresponds to block rs010. As a result, in a forward partitioning, each of the blocks fs001 through fs010 changes. In a backward partitioning, only the block rs010 changes, where blocks rs001 through rs009 remain unchanged. Accordingly, the value of each key-value pair in the forward segment list changes. In contrast, only the value of the last key-value pair in the reverse segment list changes, whereas other values in the reverse segment list remain unchanged.

The primary server can then provide (312) the updated index, including the forward and reverse segment lists, to the secondary server. The secondary server can receive (314) the updated index. Upon receiving the updated index, the secondary server can determine (316) which block has changed. Determining which block has changed can include comparing the received updated segment lists with segment lists stored locally.

In the first example as shown above, the secondary server determines that a key for fs011 indicates a new block has been created, and that the new block is not stored on the secondary server. In the second example as shown above, the secondary server determines that, although every block appears to have changed according to the forward segment list, only block rs010 appears changed according to the reverse segment list. The secondary server can designate a block as new if the key-value pair for that block is not in either the forward segment list or the reverse segment list. The secondary server can designate a block as unchanged if the key-value pair for that block remains the same in any one of the forward segment list and the reverse segment list. The secondary server can designate a block as changed if the key-value pair for that block changes in both the forward segment list and the reverse segment list.

The secondary server can then request (318) the new block or updated block or blocks as identified in stage 316. Requesting the identified block can include sending key or keys corresponding to the new or updated block or blocks to the primary server. The primary server can receive (320) the request and in response, submit (322) the requested block or blocks to the secondary server. The secondary server can receive (324) the block or blocks from the primary server. Upon receiving the block or blocks, the secondary server can rebuild (326) the data file using the received block or blocks, including appending the block or blocks to the end of the data file, or replace a block of the data file with an updated block. The secondary server can store the updated index locally on the secondary server, and wait for a next update.

Figure 4:
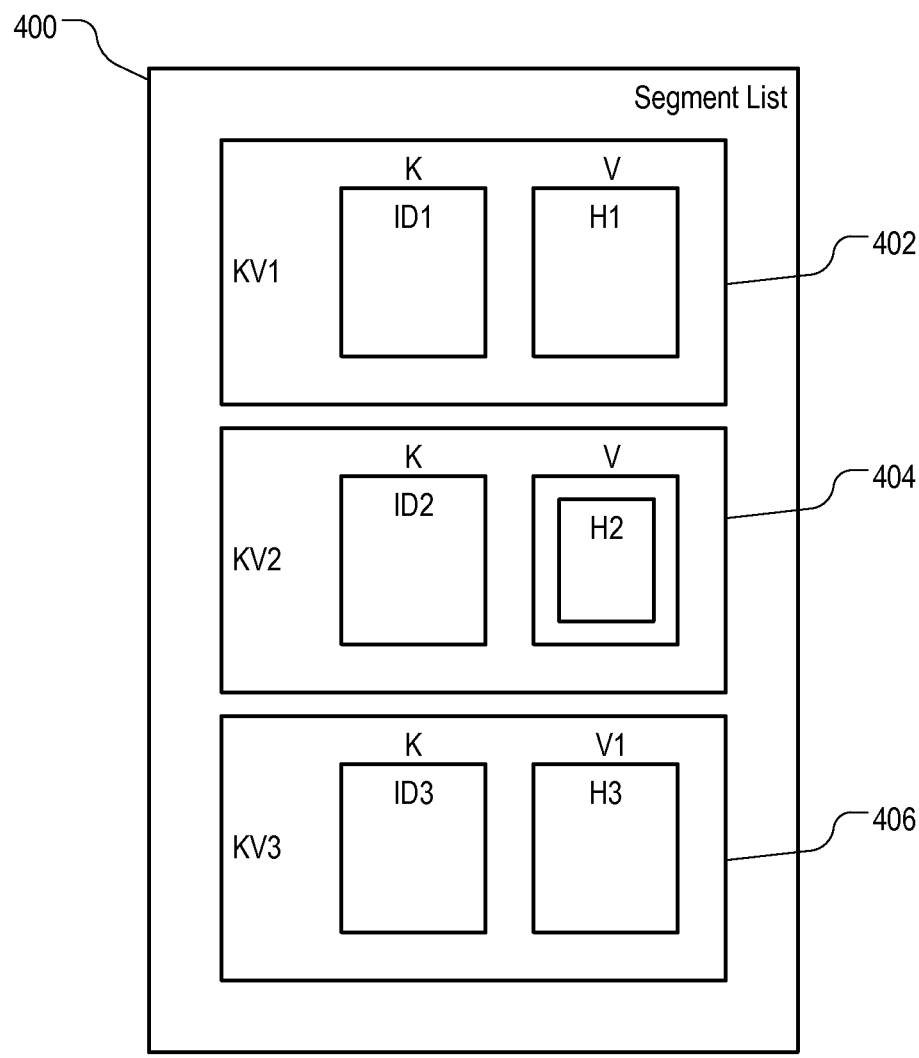
FIG. 4 is a block diagram illustrating example structure of a segment list representing partition of a data file.

FIG. 4 is a block diagram illustrating example structure of a segment list representing partition of a data file. Segment list 400 can include multiple key-value pairs, for example, key-value pairs 402, 404, and 406. Each of key-value pairs 402, 404, and 406 can include a respective key (e.g., ID1, ID2, ID3) that identifies or references a block universally across a server. Each of key-value pairs 402, 404, and 406 can include a respective value (e.g., H1, H2, H3) that is a checksum (e.g., MD6 or SHA-512 hash value) of content of a respective block. Key-value pairs 402, 404, and 406 can be sorted by key or by value.

Each of keys ID1, ID2, and ID3 can identify a data file and a location of a respective block in the data file. In some implementations, a hash value of a block can be shared among multiple files, if the files each have a same block. For example, two electronic container files may share a same digital image. When a server determines a checksum for a block, the server can determine that the hash value for the block (e.g., H2) in key-value pair 404, is same for two different blocks in two different files. The server can store a master index to track this information. The double box of H2 in key-value pair 404 illustrates the tracking. Accordingly, for example, when a secondary server determines, using an updated segment list (1) that a particular file update requires the secondary server to request a block from a primary server, and (2) that the block to request has a hash value of H2, the secondary server can determine, using the master index, that the updated block already exists on the secondary server as a part of another file. Instead of requesting the block, the secondary server can locate the block that is stored locally, and use the locally stored block to complete the update. These operations can further reduce the amount of network traffic.

Figure 5:
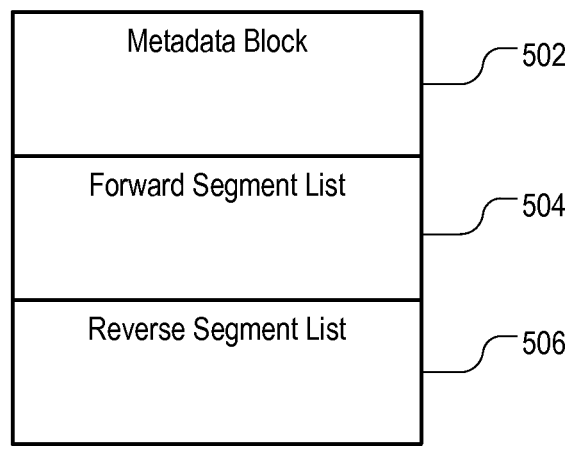
FIG. 5 is a block diagram illustrating example structure of data submitted from a primary server to a secondary server for partitioned data replication.

FIG. 5 is a block diagram illustrating example structure of data submitted from a primary server to a secondary server for partitioned data replication. The data can have metadata block 502, forward segment list 504, and reverse segment list 506. Metadata block 502 can include various information on the data submitted. The information can be a file identifier identifying the data file being updated, a header block of the data file, a master index indicating which block is shared among multiple files, a timestamp of the update, other information on the update, or a combination of one or more of the above items. Forward segment list 504 and reverse segment list 506 can include the segment lists as described in reference to FIG. 2.

Figure 6:
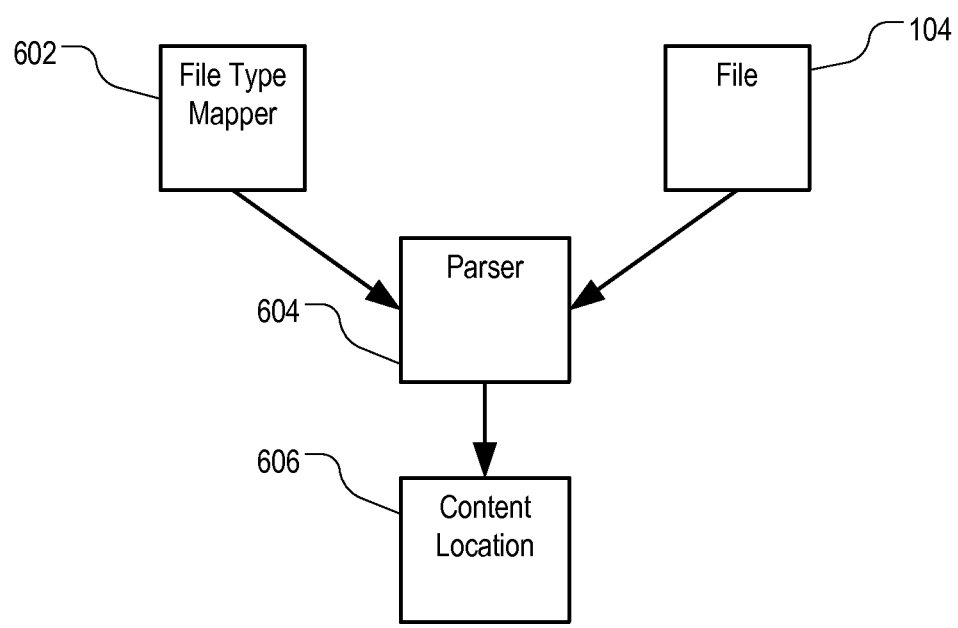
FIG. 6 is a block diagram illustrating example techniques for determining a header of a data file.

FIG. 6 is a block diagram illustrating example techniques for determining a header of a data file. A primary server can choose various block sizes (e.g., 32 KB or 64 KB) based on a type of a data file. For example, for a multimedia file, the size for each block can correspond to content type. If the file has JPG format, a server can split the file into a file header block followed by data blocks each corresponding to a×b (e.g., 32×32) pixels; for a video data, based on the video compression format, the server can split the file into a file header block, key frames, and changing frames. The server can determine a header of a data file using file type mapper 602.

The server can receive data file 104 at time data file 104 is designated for replication. Parser 604 of the server can parse data file 104 to identify a file type and determine whether the file is a movie file, an image, or a database file having a proprietary file type. Parser 604 can perform a lookup in file type mapper 602. File type mapper 602 can store known header sizes for various file types or identifiers for various file types that can indicate an end of a header or beginning of content after a header. Using the information retrieved from the lookup of file type mapper 602, parser 604 can determine content location 606, if any, for data file 104 that designates a location of content in data file 104 that is after a header. A server can then designate portions of data file 104 that is before the content location as header, and partition content after the content location into blocks.

Figure 7:
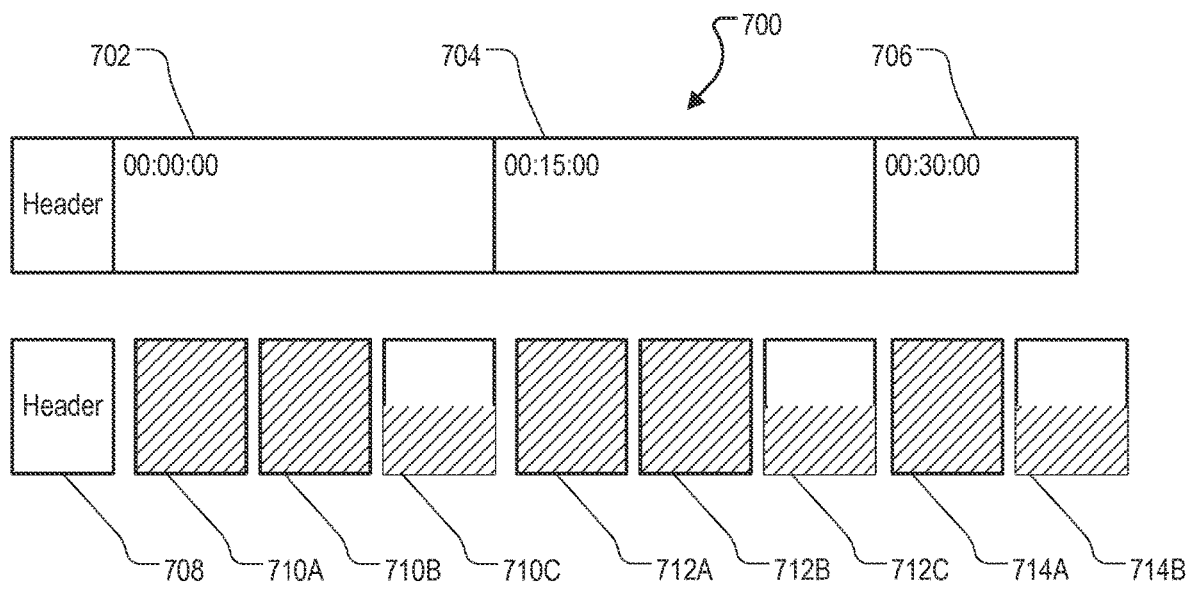
FIG. 7 is a block diagram illustrating example techniques for partitioning a large media file.

FIG. 7 is a block diagram illustrating example techniques for partitioning a large media file. A server (e.g., primary server 102 of FIG. 1) can partition some types of data files according to type specific information on those data files. For example, a particular type of data file 700 (e.g., a digital movie file) can indicate that the data file 700 that includes a header and sections 702, 704, and 706. Each of sections 702, 704, and 706 can be a portion of a movie that starts at a given chapter. Each chapter can be associated with a timestamp (e.g., 00:00:00, 00:15:00, and 00:30:00) in hour:minute:second format.

The server can designate the header of data file 700 as header block 708. The server can partition each of sections 702, 704, and 706 separately. For example, the server can partition section 702 into blocks 710A, 710B, and 710C; the server can partition section 704 into blocks 712A, 712B, and 712C; the server can partition section 706 into blocks 714A and 714B. The server can pad the last block in each section. The last blocks can include blocks 710C, 712C, and 714B. Accordingly, if an update, e.g., an edit of a movie, only changes a particular chapter, e.g., a chapter corresponding to section 702, a primary server needs to recalculate and resubmit checksums for only those blocks corresponding to that chapter (e.g., blocks 710A, 710B, and 710C) at most. The forward and reverse segment lists corresponding to other sections can remain unchanged.

Exemplary System Components

Figure 8:
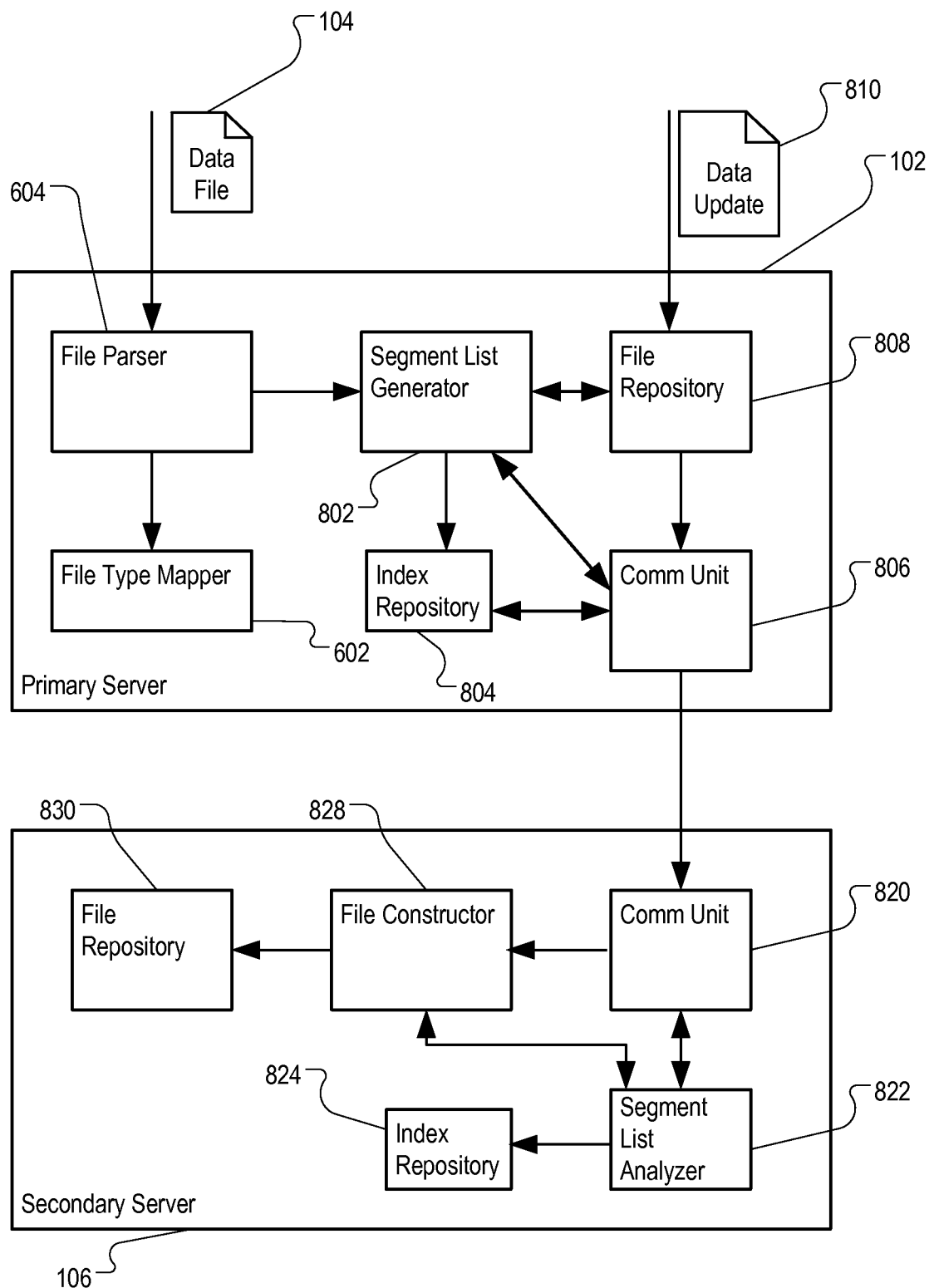
FIG. 8 is a block diagram illustrating example components of a system implementing partitioned data replication.

FIG. 8 is a block diagram illustrating example components of a system implementing partitioned data replication. The system can include primary server 102 and secondary server 106. Each component of the system can include hardware, software, firmware, cloudware, or any combination of the above.

Primary server 102 can include file parser 604 and file type mapper 602, as described above in reference to FIG. 6. File parser 604 can receive data file 104, determine a content location for data file 104, and provide the content location and data file 104 to segment list generator 802.

Segment list generator 802 is a component of primary server 102 configured to generate a forward segment list, a reverse segment list, or both, for each received data file 104. Segment list generator 802 can store the generated segment list or lists in index repository 804. Index repository 804 is a component of primary server 102 configured to store forward and reverse segment lists for each data file 104, and to generate and store a master index for the segment lists that enables multiple data files to share a single block.

Segment list generator 802 can provide a newly generated segment list to communication unit 806 for submitting to secondary server 106. Primary server 102 can store data file 104 in file repository 808. Primary server 102 can receive data update 810 changing data file 104 from a process executing on primary server 102 or remotely from primary server 102. An event of receiving data update 810 by file repository 808 can trigger segment list generator 802 to regenerate an updated forward segment list and an updated reverse segment list for data file 104. Segment list generator 802 can then store the updated segment lists in index repository 804 and send the updated segment lists to secondary server 106.

Secondary server 106 can include communication unit 820 configured to receive information from communication unit 806 of primary server 102. Upon receiving a forward segment list or a reverse segment list or both, communication unit 820 can provide the received segment list or lists to segment list analyzer 822.

Segment list analyzer 822 is a component of secondary server configured to determine one or more blocks of a data file that changed. Segment list analyzer 822 can identify the changed block from segment list or lists received from communication unit 820. Identifying the changed block can include comparing key-value pairs in the received segment list and key-value pairs in a segment list stored in index repository 824. In some implementations, segment list analyzer 822 can determine that block has changed only upon determining that a previously stored key-value pair and a newly received key-value pair for that block are different in both the forward segment list and the reverse segment list. If the key-value pair remains unchanged in only one of the forward segment list and the reverse segment list, segment list analyzer 822 can determine that the corresponding block is unchanged.

Upon determining that a block has changed, segment list analyzer 822 can obtain an updated block. Obtaining the updated block can include performing a search in index repository 824 for a hash value that is the same as a hash value in the segment list corresponding to the updated block. If segment list analyzer 822 finds a match, segment list analyzer 822 can determine that the block already stored on secondary server 106 and corresponding to the key-value pair of the hash value is equivalent to the updated block. If segment list analyzer 822 does not find a match, segment list analyzer 822 can cause communication unit 820 to request the updated block from primary server 102. Requesting the updated block can include providing a key to primary server 102 that identifies the block. Primary server 102 can then retrieve the updated block from file repository 808 and provide the updated block to secondary server through communication unit 806.

Communication unit 820, upon receiving the updated block, can provide the updated block to file constructor 828. File constructor 828 is a component of secondary server 106 configured to update a data file stored on secondary server 106 by deleting a block from the data file, appending a block to the data file, or replacing a block in the data file with an updated block. After updating the data file, file constructor 828 can store the updated data file locally, to file repository 830. File repository 830 is a component of secondary server 106 configured to store replicas of files stored in file repository 808 of primary server 102. Meanwhile, segment list analyzer 822 can store an updated segment list in index repository 824.

Each component of primary server 102 can have an equivalent component on secondary server 106. Likewise, each component of secondary server 106 can have an equivalent duplicated component on primary server 102. Accordingly, if primary server 102 is down, secondary server 106 can take over and perform operations of primary server 102 without delay.

Exemplary Processes

Figure 9:
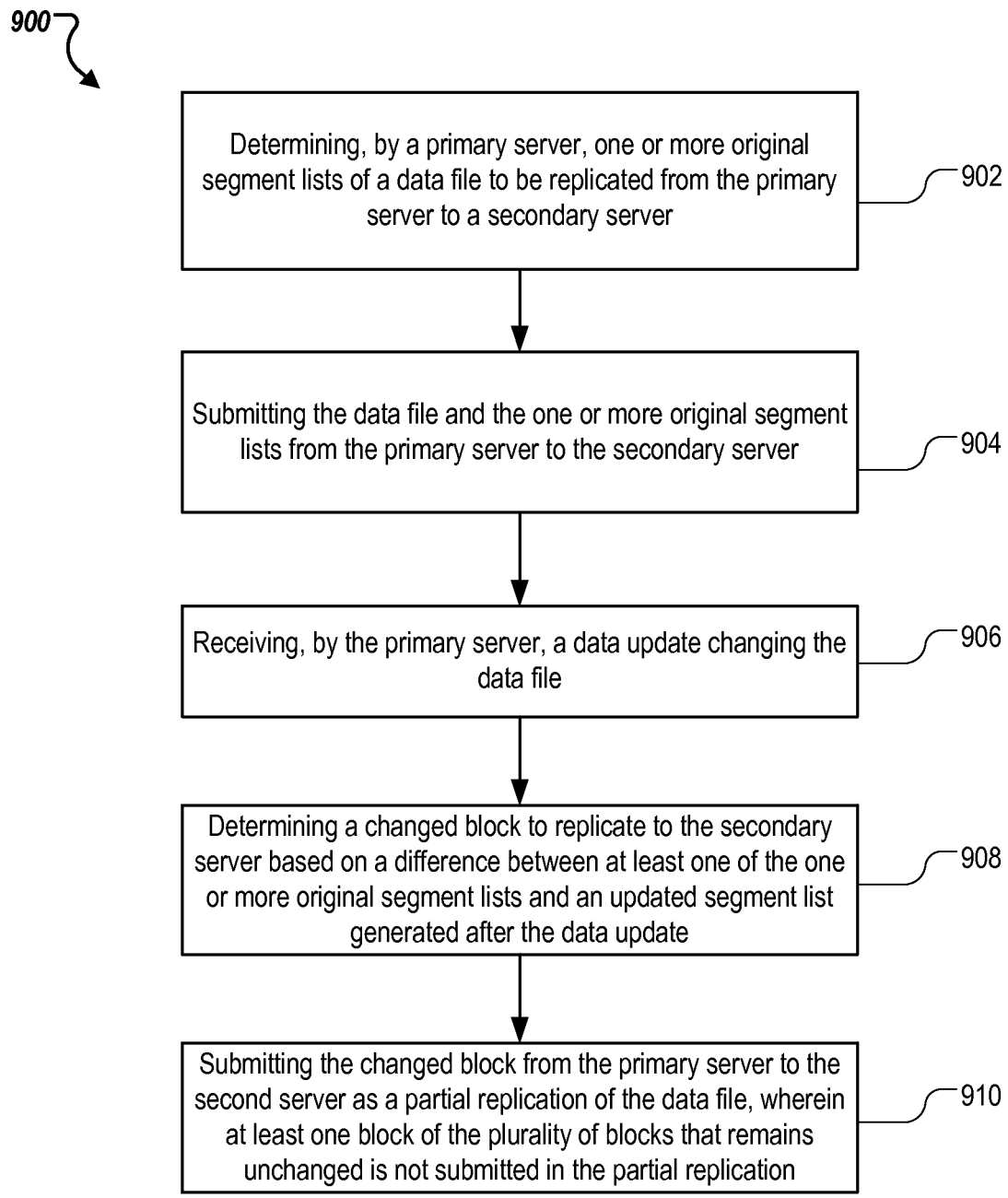
FIG. 9 is a flowchart of an example process of partitioned data replication.

FIG. 9 is a flowchart of example process 900 of partitioned data replication. Process 900 can be performed by a system. The system can include a primary server (e.g., primary server 102) and a secondary server (e.g., secondary server 106).

A primary server can determine (902) one or more original segment lists of a data file to be replicated from the primary server to a secondary server. Determining the one or more original segment lists can include partitioning the data file into one or more series of blocks. Determining the one or more original segment lists can include generating a respective key-value pair for each of the blocks. Each key-value pair can include a key that identifies the respective block, for example, by referencing a location of the respective block in the data file. Each key-value pair can include a value representing content of the respective block. Determining the one or more original segment lists can include inserting one or more series of the key-value pairs into the one or more original segment lists.

The primary server can submit (904) the data file and the one or more original segment lists from the primary server to the secondary server in an initial replication. The secondary server can store the data file and the one or more original segment lists.

The primary server can receive (906) a data update changing the data file. The primary server can determine (908) a changed block to replicate to the secondary server based on a difference between at least one of the one or more original segment lists and an updated segment list generated after the data update. The primary server can submit (910) the changed block from the primary server to the secondary server as a partial replication of the data file. In the partial update, at least one block of the blocks that remains unchanged is not submitted to the secondary server.

Figure 10:
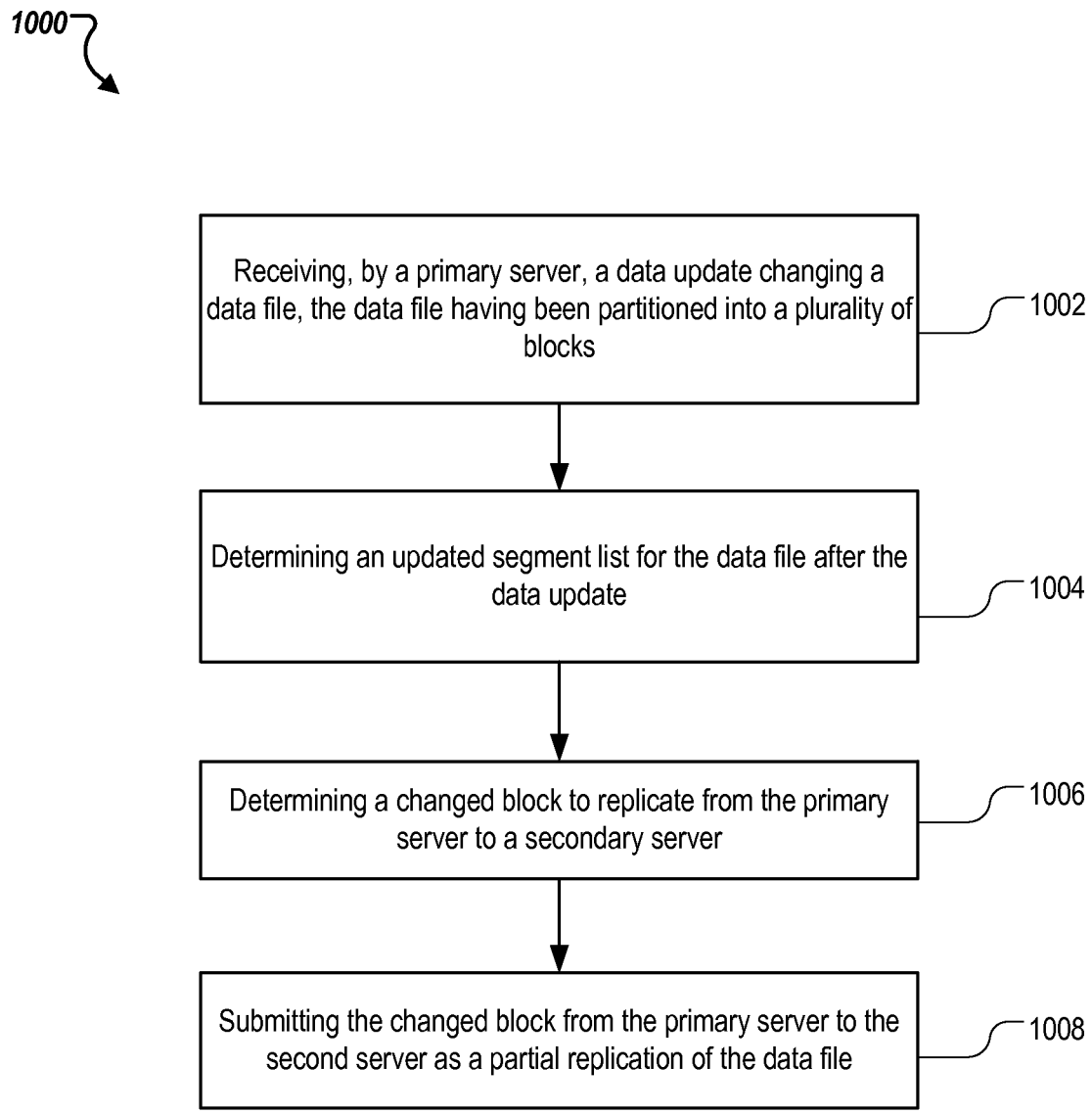
FIG. 10 is a flowchart of another example process of partitioned data replication.

FIG. 10 is a flowchart of another example process 1000 of partitioned data replication. Process 1000 can be performed by a system. The system can include a primary server (e.g., primary server 102) and a secondary server (e.g., secondary server 106).

A primary server can receive (1002) a data update changing a data file. The primary server previously partitioned the data file into multiple blocks. The primary server represents each block a respective key-value pair in one or more original segment lists. Each original segment list includes multiple key-value pairs. Each key being an identifier of a corresponding block and referencing a location of the corresponding block in the data file. Each value can be a hash value of the block.

Before receiving the data update, the primary server can determine the one or more original segment lists of the data file to be replicated from the primary server to the secondary server. Determining the one or more original segment lists can include partitioning the data file into one or more series of blocks; generating a respective key-value pair for each of the blocks. Each key-value pair can include a key that references a location of the respective block in the data file. In some implementations, each key can include a file identifier portion that identifies the data file. Each key-value pair can include a hash value of content of the respective block. Determining the one or more original segment lists can include inserting one or more series of the key-value pairs into the one or more original segment lists. The primary server can then submit the data file and the one or more original segment lists from the primary server to the secondary server.

In some implementations, partitioning the data file into the series of blocks can include determining a block size for the data file using a block size rule that specifies at least one of (1) a correspondence between a file type and the block size or (2) a correspondence between a file size and a block size. The primary server can then partition the data file into the series of blocks each having the block size.

In some implementations, partitioning the data file into the series of blocks can include determining a header section of the data file and a content section of the data file. The header section can include metadata on data stored in the content section of the data file. The primary server can then partition the data file into blocks that include a header block corresponding to the header section and other blocks corresponding to the content section of the data file.

In some implementations, generating the one or more original segment lists can include generating a forward original segment list of the one or more original segment list and generating a reverse original segment list. Generating the forward original segment list can include partitioning the data file into a forward series of blocks including a header block followed by a series of content blocks ordered from a beginning of the data file toward an end of the data file. The primary server can then generate a forward series of key-value pairs corresponding to the forward series of blocks. The primary server can generate the forward original segment list by inserting the forward series of key-value pairs into the forward original segment list. In some implementations, the segment lists are generated on a per-file basis. Each pair of forward and reverse segment lists are associated with a data file.

Generating the reverse original segment list of the one or more original segment list can include partitioning the data file into a reverse series of blocks including a header block followed by a series of content blocks ordered from an end of the data file toward a beginning of the data file. The primary server can then generate a reverse series of key-value pairs corresponding to the reverse series of blocks. The primary server can generate the reverse original segment list by inserting the forward series of key-value pairs into the reverse original segment list.

The primary server can determine (1004) an updated segment list for the data file after the data update. The primary server can determine a forward updated segment list and a reverse updated segment list in a manner similar to determining the forward and reverse original segment lists.

In some implementations, determining the updated segment list can include, in response to the data update, generating the updated segment list including a new series of key-value pairs that represent the changed data file. The new series of key-value pairs can include an original key-value pair that is same as a key-value pair in the original segment list indicating that a corresponding block has not changed, and a new key-value pair that is different from each key-value pair in the original segment list indicating that a corresponding block has changed. The primary server can submit the updated segment list to the secondary server.

The primary server can determine (1006) a changed block to replicate from the primary server to a secondary server based on a difference between at least one of the one or more original segment lists and the updated segment list generated after the data update. The difference can include a changed value in the key-value pairs corresponding to a key referencing the changed block.

In some implementations, determining the changed block to replicate to the secondary server can include submitting the updated segment list from the primary server to the secondary server to indicate that the data file has changed. The primary server can receive from the secondary server a message indicating that the secondary server requests a block. The primary server can determine that the block being requested by the secondary server is the changed block to be replicated to the secondary server.

The primary server can submit (1008) the changed block from the primary server to the secondary server as a partial replication of the data file. Upon receiving the changed block, the secondary server can replicate the change. Replicating the change can include constructing an updated data file using the original data file received earlier and the changed block received later.

The system can detect a failure in the primary server. In response, the system can designate the secondary server as a new primary server. Designating the secondary server as the new primary server can include replicating, by the secondary server, the updated segment list and a data file that includes the replicated update to another server. The secondary server can perform functions as a primary server. The other server can be designated as a new secondary server.

Exemplary System Architecture

Figure 11:
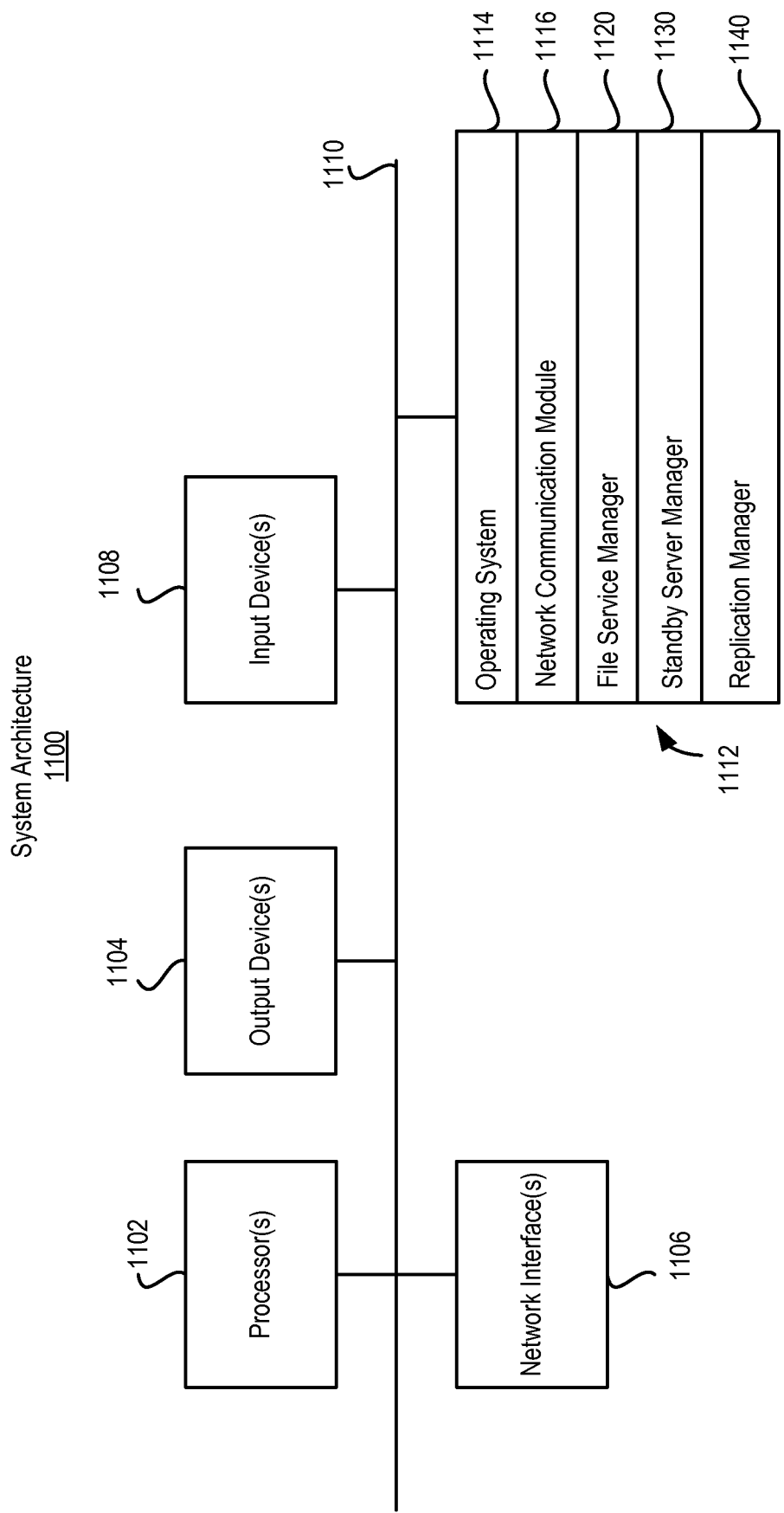
FIG. 11 is a block diagram illustrating an example system implementing the features and operations described in reference to FIGS. 1-10.

FIG. 11 is a block diagram of an exemplary system architecture for implementing the features and operations of FIGS. 1-10. Other architectures are possible, including architectures with more or fewer components. In some implementations, architecture 1100 includes one or more processors 1102 (e.g., dual-core Intel® Xeon® Processors), one or more output devices 1104 (e.g., LCD), one or more network interfaces 1106, one or more input devices 1108 (e.g., mouse, keyboard, touch-sensitive display) and one or more computer-readable media 1112 (e.g., RAM, ROM, SDRAM, hard disk, optical disk, flash memory, etc.). These components can exchange communications and data over one or more communication channels 1110 (e.g., buses), which can utilize various hardware and software for facilitating the transfer of data and control signals between components.

The term "computer-readable medium" refers to a medium that participates in providing instructions to processor 1102 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1112 can further include operating system 1114 (e.g., a Linux® operating system), network communication module 1116, file service manager 1120, standby server manager 1130, and replication manager 1140. Operating system 1114 can be multi-user, multiprocessing, multitasking, multithreading, real time, etc. Operating system 1114 performs basic tasks, including but not limited to: recognizing input from and providing output to network interface 1106, device 1108; keeping track and managing files and directories on computer-readable mediums 1112 (e.g., memory or a storage device); controlling peripheral devices; and managing traffic on the one or more communication channels 1110. Network communications module 1116 includes various components for establishing and maintaining network connections (e.g., software for implementing communication protocols, such as TCP/IP, HTTP, etc.).

File service manager 1120 can include computer instructions that, when executed, cause processor 1102 to perform operations of updating one or more data files. Standby server manager 1130 can include computer instructions that, when executed, cause processor 1102 to perform functions of a primary server or secondary server of a system, and to change roles from a primary server to a secondary server or from a secondary server to a primary server. Replication manager 1140 can include computer instructions that, when executed, cause processor 1102 to perform partitioned data replication as described above in reference to FIGS. 1-10.

Architecture 1100 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A system comprising:
  a primary server; and
  a secondary server, wherein the system is configured to perform operations comprising:
    determining, by the primary server, one or more original segment lists of a data file to be replicated from the primary server to the secondary server, determining the one or more original segment lists comprising:
      partitioning the data file into one or more series of blocks;
      generating a respective key-value pair for each of the blocks, each key-value pair comprising a key that identifies the respective block in the data file and a value that includes a hash value of content of the respective block, wherein the hash value is used to determine that the block has changed by comparing the hash value with a previously stored hash value for the block on the secondary server, and wherein if a block appears in multiple files, the value in the key-value pair is a list of unique identifiers, each unique identifier representing an appearance of the block in one of the files of the multiple files; and
      inserting one or more series of the key-value pairs into the one or more original segment lists;
    submitting the data file and the one or more original segment lists from the primary server to the secondary server;
    receiving, by the primary server, a data update changing the data file;
    determining a changed block to replicate to the secondary server based on a difference between at least one of the one or more original segment lists and an updated segment list generated after the data update; and submitting the changed block from the primary server to the secondary server as a partial replication of the data file, wherein at least one block of the one or more series of blocks that remains unchanged is not submitted in the partial replication, wherein submitting the changed block from the primary server to the secondary server causes a copy of the data file stored on the secondary server, after the partial replication, to be identical to the changed data file stored on the primary server, and wherein each of the primary server and the secondary server includes one or more computer processors.

2. The system of claim 1, wherein the key of a key-value pair of a block references a location of the block in the data file.

3. A method, comprising:

receiving, by a primary server, a data update changing a data file, the data file having been partitioned into a plurality of blocks, each block being represented by a respective key-value pair in one or more original segment lists each including a plurality of key-value pairs, each key being an identifier of a corresponding block, each value being a hash value of the corresponding block in the data file, wherein the hash value is used to determine that the corresponding block has changed by comparing the hash value with a previously stored hash value for the block on a secondary server, and wherein if a block appears in multiple files, the value in the key-value pair is a list of unique identifiers, each unique identifier representing an appearance of the block in one of the files of the multiple files;

determining an updated segment list for the data file after the data update;

determining a changed block to replicate from the primary server to the secondary server based on a difference between at least one of the one or more original segment lists and the updated segment list generated after the data update, wherein the difference includes a changed value in the key-value pairs corresponding to a key referencing the changed block; and submitting the changed block from the primary server to the secondary server as a partial replication of the data file, wherein submitting the changed block from the primary server to the secondary server causes a copy of the data file stored on the secondary server, after the partial replication, to be identical to the changed data file stored on the primary server, and wherein each of the primary server and the secondary server includes one or more computer processors.

4. The method of claim 3, comprising:

prior to receiving the data update, determining, by the primary server, the one or more original segment lists of the data file to be replicated from the primary server to the secondary server, wherein determining the one or more original segment lists comprises:

partitioning the data file into one or more series of blocks;

generating a respective key-value pair for each of the blocks, each key-value pair comprising a key that includes the hash value and a value that references a location of the respective block in the data file; and inserting one or more series of the key-value pairs into the one or more original segment lists; and submitting the data file and the one or more original segment lists from the primary server to the secondary server.

5. The method of claim 4, wherein partitioning the data file into the series of blocks comprises:

determining a block size for the data file using a block size rule that specifies at least one of a correspondence between a file type and the block size or a correspondence between a file size and a block size; and partitioning the data file into the series of blocks each having the block size.

6. The method of claim 4, wherein partitioning the data file into the series of blocks comprises:

determining a header section of the data file and a content section of the data file, the header section including metadata on data stored in the content section of the data file; and partitioning the data file into blocks that include a header block corresponding to the header section and other blocks corresponding to the content section.

7. The method of claim 4, wherein generating the one or more original segment lists comprises:

generating a forward original segment list of the one or more original segment list, comprising:

partitioning the data file into a forward series of blocks including a header block followed by a series of content blocks ordered from a beginning of the data file toward an end of the data file;

generating a forward series of key-value pairs corresponding to the forward series of blocks; and generating the forward original segment list by inserting the forward series of key-value pairs into the forward original segment list; and generating a reverse original segment list of the one or more original segment list, comprising:

partitioning the data file into a reverse series of blocks including a header block followed by a series of content blocks ordered from an end of the data file toward a beginning of the data file;

generating a reverse series of key-value pairs corresponding to the reverse series of blocks; and generating the reverse original segment list by inserting the reverse series of key-value pairs into the reverse original segment list.

8. The method of claim 3, wherein determining the updated segment list comprises:

in response to the data update, generating the updated segment list including a new series of key-value pairs that represent the changed data file, the new series of key-value pair including:

an original key-value pair that is same as a key-value pair in the original segment list indicating that a corresponding block has not changed, and a new key-value pair that is different from each key-value pair in the original segment list indicating that a corresponding block has changed.

9. The method of claim 3, wherein determining the changed block to replicate to the secondary server comprises:

submitting the updated segment list from the primary server to the secondary server to indicate that the data file has changed;

receiving, by the primary server and from the secondary server, a message indicating that the secondary server requests a block; and determining, by the primary server, that the block being requested by the secondary server is the changed block to be replicated to the secondary server.

10. The method of claim 3, comprising:
upon receiving the changed block, replicating the change by the secondary server, including constructing an updated data file using the data file received by the secondary server earlier and the changed block received by the secondary server later.

11. The method of claim 3, comprising:
detecting a failure in the primary server; and
in response, designating the secondary server as a new primary server, including replicating, by the secondary server, the updated segment list and another data file that includes the replicated update to another server.

12. A system, comprising:
one or more processors; and
one or more non-transitory computer-readable media storing instructions that, when executed by the one or more processors, cause the one or more processors to perform operations comprising:
receiving, by a primary server, a data update changing a data file, the data file having been partitioned into a plurality of blocks, each block being represented by a respective key-value pair in one or more original segment lists each including a plurality of key-value pairs, each key being an identifier of a corresponding block, each value being a hash value of the corresponding block in the data file, wherein the hash value is used to determine that the block has changed by comparing the hash value with a previously stored hash value for the block on a secondary server, and wherein if a block appears in multiple files, the value in the key-value pair is a list of unique identifiers, each unique identifier representing an appearance of the block in one of the files of the multiple files;
determining an updated segment list for the data file after the data update;
determining a changed block to replicate from the primary server to the secondary server based on a difference between at least one of the one or more original segment lists and the updated segment list generated after the data update, wherein the difference includes a changed value in the key-value pairs corresponding to a key referencing the changed block; and
submitting the changed block from the primary server to the secondary server as a partial replication of the data file, wherein submitting the changed block from the primary server to the secondary server causes a copy of the data file stored on the secondary server, after the partial replication, to be identical to the changed data file stored on the primary server.

13. The system of claim 12, the operations comprising:
prior to receiving the data update, determining, by the primary server, the one or more original segment lists of the data file to be replicated from the primary server to the secondary server, wherein determining the one or more original segment lists comprises:
partitioning the data file into one or more series of blocks;
generating a respective key-value pair for each of the blocks, each key-value pair comprising a key that includes the hash value and a value that references a location of the respective block in the data file; and
inserting one or more series of the key-value pairs into the one or more original segment lists; and submitting the data file and the one or more original segment lists from the primary server to the secondary server.

14. The system of claim 13, wherein partitioning the data file into the series of blocks comprises:
determining a block size for the data file using a block size rule that specifies at least one of a correspondence between a file type and the block size or a correspondence between a file size and a block size; and
partitioning the data file into the series of blocks each having the block size.

15. The system of claim 13, wherein partitioning the data file into the series of blocks comprises:
determining a header section of the data file and a content section of the data file, the header section including metadata on data stored in the content section of the data file; and
partitioning the data file into blocks that include a header block corresponding to the header section and other blocks corresponding to the content section.

16. The system of claim 13, wherein generating the one or more original segment lists comprises:
generating a forward original segment list of the one or more original segment list, comprising:
partitioning the data file into a forward series of blocks including a header block followed by a series of content blocks ordered from a beginning of the data file toward an end of the data file;
generating a forward series of key-value pairs corresponding to the forward series of blocks; and
generating the forward original segment list by inserting the forward series of key-value pairs into the forward original segment list; and
generating a reverse original segment list of the one or more original segment list, comprising:
partitioning the data file into a reverse series of blocks including a header block followed by a series of content blocks ordered from an end of the data file toward a beginning of the data file;
generating a reverse series of key-value pairs corresponding to the reverse series of blocks; and
generating the reverse original segment list by inserting the reverse series of key-value pairs into the reverse original segment list.

17. The system of claim 12, wherein determining the updated segment list comprises:
in response to the data update, generating the updated segment list including a new series of key-value pairs that represent the changed data file, the new series of key-value pair including:
an original key-value pair that is same as a key-value pair in the original segment list indicating that a corresponding block has not changed, and
a new key-value pair that is different from each key-value pair in the original segment list indicating that a corresponding block has changed.

18. The system of claim 12, wherein determining the changed block to replicate to the secondary server comprises:
submitting the updated segment list from the primary server to the secondary server to indicate that the data file has changed;
receiving, by the primary server and from the secondary server, a message indicating that the secondary server requests a block; and determining, by the primary, that the block being requested by the secondary server is the changed block to be replicated to the secondary server.

19. The system of claim 12, the operations comprising:
upon receiving the changed block, replicating the change by the secondary server, including constructing an updated data file using the data file received by the secondary server earlier and the changed block received by the secondary server later.

20. The system of claim 12, comprising:
detecting a failure in the primary server; and
in response, designating the secondary server as a new primary server, including replicating, by the secondary server, the updated segment list and a data file that includes the replicated update to another server.

21. One or more non-transitory computer-readable media storing instructions that, when executed by one or more processors, cause the one or more processors to perform operations comprising:
receiving, by a primary server, a data update changing a data file, the data file having been partitioned into a plurality of blocks, each block being represented by a respective key-value pair in one or more original segment lists each including a plurality of key-value pairs, each key being an identifier of a corresponding block, each value being a hash value of the corresponding block in the data file, wherein the hash value is used to determine that the block has changed by comparing the hash value with a previously stored hash value for the block on a secondary server, and wherein if a block appears in multiple files, the value in the key-value pair is a list of unique identifiers, each unique identifier representing an appearance of the block in one of the files of the multiple files;
determining an updated segment list for the data file after the data update;
determining a changed block to replicate from the primary server to the secondary server based on a difference between at least one of the one or more original segment lists and the updated segment list generated after the data update, wherein the difference includes a changed value in the key-value pair corresponding to a key referencing the changed block; and
submitting the changed block from the primary server to the secondary server as a partial replication of the data file, wherein submitting the changed block from the primary server to the secondary server causes a copy of the data file stored on the secondary server, after the partial replication, to be identical to the changed data file stored on the primary server.

22. The non-transitory computer-readable media of claim 21, the operations comprising:
prior to receiving the data update, determining, by the primary server, the one or more original segment lists of the data file to be replicated from the primary server to the secondary server, wherein determining the one or more original segment lists comprises:
partitioning the data file into one or more series of blocks;
generating a respective key-value pair for each of the blocks, each key-value pair comprising a key that includes the hash value and a value that references a location of the respective block in the data file; and
inserting one or more series of the key-value pairs into the one or more original segment lists; and
submitting the data file and the one or more original segment lists from the primary server to the secondary server.

23. The one or more non-transitory computer-readable media of claim 22, wherein partitioning the data file into the series of blocks comprises:
determining a block size for the data file using a block size rule that specifies at least one of a correspondence between a file type and the block size or a correspondence between a file size and a block size; and
partitioning the data file into the series of blocks each having the block size.

24. The one or more non-transitory computer-readable media of claim 22, wherein partitioning the data file into the series of blocks comprises:
determining a header section of the data file and a content section of the data file, the header section including metadata on data stored in the content section of the data file; and
partitioning the data file into blocks that include a header block corresponding to the header section and other blocks corresponding to the content section.

25. The one or more non-transitory computer-readable media of claim 22, wherein generating the one or more original segment lists comprises:
generating a forward original segment list of the one or more original segment list, comprising:
partitioning the data file into a forward series of blocks including a header block followed by a series of content blocks ordered from a beginning of the data file toward an end of the data file;
generating a forward series of key-value pairs corresponding to the forward series of blocks; and
generating the forward original segment list by inserting the forward series of key-value pairs into the forward original segment list; and
generating a reverse original segment list of the one or more original segment list, comprising:
partitioning the data file into a reverse series of blocks including a header block followed by a series of content blocks ordered from an end of the data file toward a beginning of the data file;
generating a reverse series of key-value pairs corresponding to the reverse series of blocks; and
generating the reverse original segment list by inserting the reverse series of key-value pairs into the reverse original segment list.

26. The one or more non-transitory computer-readable media of claim 21, wherein determining the updated segment list comprises:
in response to the data update, generating the updated segment list including a new series of key-value pairs that represent the changed data file, the new series of key-value pair including:
an original key-value pair that is same as a key-value pair in the original segment list indicating that a corresponding block has not changed, and
a new key-value pair that is different from each key-value pair in the original segment list indicating that a corresponding block has changed.

27. The one or more non-transitory computer-readable media of claim 21, wherein determining the changed block to replicate to the secondary server comprises:
submitting the updated segment list from the primary server to the secondary server to indicate that the data file has changed;

receiving, by the primary server and from the secondary server, a message indicating that the secondary server requests a block; and determining, by the primary server, that the block being requested by the secondary server is the changed block to be replicated to the secondary server.

28. The system of claim 1, wherein the data file is partitioned into one or more series of blocks based on content of the data file.

29. The method of claim 3, wherein the data file is partitioned into one or more series of blocks based on content of the data file.

30. The system of claim 12, wherein the data file is partitioned into one or more series of blocks based on content of the data file.

31. The one or more non-transitory computer-readable media of claim 21, wherein the data file is partitioned into one or more series of blocks based on content of the data file.

* * * * *